United States Patent [19]

Ueno et al.

[11] 4,127,505

[45] * Nov. 28, 1978

[54] PROCESS FOR THE PRODUCTION OF A CATALYST COMPONENT FOR USE IN THE POLYMERIZATION OF α-OLEFINS

[75] Inventors: Hiroshi Ueno; Naomi Inaba, both of Ooi; Tokyo Makishima, Kawagoe; Shozo Wada, Zushi, all of Japan

[73] Assignee: Toa Nenryo Kogyo Kabushiki Kaisha, Tokyo, Japan

[ * ] Notice: The portion of the term of this patent subsequent to Dec. 13, 1994, has been disclaimed.

[21] Appl. No.: 744,236

[22] Filed: Nov. 23, 1976

[30] Foreign Application Priority Data

Nov. 25, 1975 [JP] Japan ................................ 50-140191

[51] Int. Cl.$^2$ ................................................ C08F 4/64
[52] U.S. Cl. ............................... 252/429 B; 526/142; 526/159
[58] Field of Search ........................... 252/429 B, 441

[56] References Cited

U.S. PATENT DOCUMENTS

| | | |
|---|---|---|
| 3,769,233 | 10/1973 | Hermans et al. ............ 252/429 B X |
| 3,825,524 | 7/1974 | Wada et al. ................. 252/429 B X |
| 3,862,257 | 1/1975 | Buben et al. ................ 252/429 B X |
| 3,960,765 | 6/1976 | Shiga et al. ..................... 252/429 B |
| 3,984,350 | 10/1976 | Karayannis et al. ............ 252/429 B |
| 4,062,804 | 12/1977 | Ueno et al. ..................... 252/429 B |
| 4,064,069 | 12/1977 | Ueno et al. ..................... 252/429 B |

*Primary Examiner*—Patrick Garvin
*Attorney, Agent, or Firm*—W. T. Clarke; M. B. Kurtzman

[57] ABSTRACT

The invention relates to a process for the production of a catalyst component for use in the polymerization of α-olefins, which comprises reacting titanium tetrachloride with a dialkylaluminum monohalide and monoalkylaluminum dihalide, said dialkylaluminum monohalide being in a proportion of at least equimolar to said titanium tetrachloride, to thus obtain a violet reduced solid, then removing aluminum compounds contained in said reduced solid and further activating with a mixture or complex of titanium tetrachloride and a dialkyl ether of the general formula ROR' wherein R and R' are the same or different and are (a) alkyl groups having 1–4 carbon atoms, (b) normal alkyl groups having 5 carbon atoms or (c) alkyl groups having 6–20 carbon atoms and to a catalyst component prepared by the process of the invention.

19 Claims, No Drawings

PROCESS FOR THE PRODUCTION OF A CATALYST COMPONENT FOR USE IN THE POLYMERIZATION OF α-OLEFINS

FIELD OF THE INVENTION

This invention relates to an improvement in a catalyst component for use in the polymerization of α-olefins (which will hereinafter be referred to as "catalyst component") and more particularly, to a process for the production of a catalyst component capable of producing polymer having a narrow particle size distribution whereby in the stereoregular polymerization of α-olefins such as propylene, in particular, not only the stereoregularity is improved but also the polymerization rate is markedly increased.

DESCRIPTION OF THE PRIOR ART

As a method of producing a crystalline polyolefin on a commercial scale, it has been widely known to use a polymerization catalyst comprising, in combination, a catalyst component consisting of a low valence transition metal halide, and an organo metal halide compound. In particular, a titanium trichloride composition has been used as the low valence metal halide.

A known method of preparing a titanium trichloride composition consists in reducing titanium tetrachloride by metallic aluminum at a high temperature and then grinding the product for activation. The catalyst component prepared in this way is ordinarily called Grade AA titanium trichloride, which contains, in addition to titanium trichloride, aluminum chloride in an eutectic form. When this product is used as a polymerization catalyst, the rate of polymerization and the stereoregularity of the product are unsatisfactory. For commercial scale operation, a large amount of expensive catalyst is necessary and treatment of non-crystalline polymer byproducts involves substantial costs.

Many efforts have been made to overcome these disadvantages. For example, some of the catalytic components have been removed to improve somewhat the polymerization rate or product stereoregularity by extracting with a solvent (Soga et al. "Shokubai (Catalyst)" Vol. 11, page 75 (1969)), reacting with an ether compound followed by washing (Japanese Patent Publication No. 3356/1978, published Feb. 6, 1978) or grinding together with various materials followed by solvent extraction (Japanese Patent Publication No. 26376/1972). In these methods, however, the particle size distribution of the catalytic component has not been sufficiently reduced, so that a polymer obtained using this catalyst component may also have a wide particle size distribution, resulting in trouble in handling this polymer powder.

Another known method of preparing a titanium trichloride composition consists in reducing titanium tetrachloride with diethylaluminum chloride in a proportion substantially equimolar or less to the titanium atom present at low temperature, as disclosed in, for example, Japanese Patent Publication Nos. 10415/1971, 21575/1972 and 11807/1972. This method has the advantage that a catalytic component with a relatively even particle size can be obtained, but, on the other hand, the titanium trichloride composition obtained by this method is a brown β-type titanium trichloride composition which has inferior polymerization capacity. Therefore, it is necessary to subject this composition to a heat activation treatment to convert it to a violet titanium trichloride composition. However, when this product is used as a polymerization catalyst the polymerization rate and stereo-regularity of the product are not superior to those obtained when the above described Grade AA titanium trichloride is used. The alkylaluminum dihalide byproduct of the reduction in the above-described method is regarded as a harmful material to the catalytic component and, as described in the above-publications, for example, Japanese Patent Publication No. 10415/1971, therefore, it is recommended to treat it with a complexing agent such as an ether compound. Even if this treatment is carried out when the reduced solid is subjected to a heating and activating treatment, the catalytic activity of the resulting component is deficient.

As a further method of preparing a titanium trichloride composition, it has been proposed to obtain a catalyst component capable of giving a relatively high polymerization rate, high stereoregularity and excellent particle size distribution by reducing titanium tetrachloride by diethylaluminum chloride at a low temperature to form a β-type titanium trichloride composition and then to treat it with a complexing agent and titanium tetrachloride to convert it into a violet δ-type catalyst solid. Howwever, this method has the disadvantage that when using a complexing agent other than diisoamyl ether, the titanium trichloride composition is not substantially improved. Also it is necessary to use a reagent having a concentration of 15% by volume or more, preferably 30 to 40% by volume when treating titanium tetrachloride. Since diisoamyl ether is an expensive reagent which is 10 to 20 times more expensive than other organic ether compounds or about 10 times more expensive than the product marketed as Grade AA titanium trichloride, The above-described method as the disadvantage that the production cost of the catalyst component on a commercial scale is high even though the product exhibits excellent properties as a catalyst.

SUMMARY OF THE INVENTION

The present invention which overcomes the various disadvantages of these known catalyst components provides a catalyst component having excellent catalytic properties obtained by reducing titanium tetrachloride with dialkylaluminum monohalide and, in addition, alkylaluminum dihalide. Furthermore, it is found that the above described catalyst component may be processed to obtain a catalyst component having improved polymerization activity and the capability of producing polymer having high stereoregularity and narrow particle size distribution.

Thus, the present invention provides a process for the production of a catalyst component for use in the polymerization of α-olefins, which comprises reacting titanium tetrachloride with a dialkylaluminum monohalide and monoalkylaluminum dihalide (said dialkylaluminum monohalide being in a proportion of equimolar or more to said titanium tetrachloride) to thus obtain a violet reduced solid, then removing aluminum compounds contained in said reduced solid and further activating with a complex consisting of a dialkyl ether having the formula ROR' wherein R and R' are the same or different and are each selected from (a) alkyl groups having 1 to 4 carbon atoms, (b) normal alkyl groups of five carbon atoms and (c) alkyl groups having 6 to 20 carbon atoms.

Useful examples of the dialkylaluminum monohalide which can be used for the reduction of titanium tetrachloride in the process of the invention are dimethylaluminum chloride, diethylaluminum chloride, dibutylaluminum chloride, diethylaluminum bromide, diethylaluminum iodide and the like. Diethylaluminum chloride is preferable because it is readily obtainable commercially and also excellent in processing capacity.

Useful examples of the monoalkylaluminum halide to be present together with the dialkylaluminum monohalide in the process of the invention are methylaluminum dichloride, ethylaluminum dichloride, butylaluminum dichloride, ethylaluminum dibromide and ethylaluminum diodide. Ethylaluminum dichloride is preferably used.

PREFERRED EMBODIMENTS

The present invention will now be described specifically using the case of ethylaluminum dichloride and diethylaluminum chloride in combination as illustrated, with no intent to be limited thereby.

As described above, the method of reducing titanium tetrachloride by diethylaluminum chloride is well known to those skilled in the art. This reaction can be represented by the following equations:

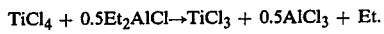

$$TiCl_4 + 0.5Et_2AlCl \rightarrow TiCl_3 + 0.5AlCl_3 + Et.$$

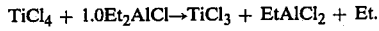

$$TiCl_4 + 1.0Et_2AlCl \rightarrow TiCl_3 + EtAlCl_2 + Et.$$

As is apparent from these equations, the ratio of diethylaluminum chloride and titanium tetrachloride is ordinarily 0.5:1 to 1.0:1. It is well known that the presence of the compound, formed by this reaction, i.e., ethylaluminum dichloride is detrimental to the polymerization reaction and, therefore, efforts have been made to remove the compound as far as possible after the reducing reaction. However, according to the invention a violet reduced solid is obtained by reducing titanium tetrachloride by diethylaluminum chloride in a proportion of 1 mol or more to 1 mol of the titanium tetrachloride together with ethylaluminum dichloride in a suitable amount, in particular, in a proportion of 0.3 to 1.2 mol to 1 mol of the titanium tetrachloride. This phenomenon is very interesting in view of the fact that only a brown reduced solid is obtained according to the prior art method, that is, in the case of effecting the reduction with diethylaluminum monochloride only without ethylaluminum dichloride. X-ray diffraction spectra show that, in the case of brown reduced solid obtained by the prior art method, the peak of β-type crystal is considerably larger than the peak of α-type crystal, while in the case of a violet reduced solid obtained according to the present invention, the peak of β-type crystal is very small or scarcely appears and the peak of α-type crystal appears strongly.

In the process of the present invention, aluminum compounds contained in the violet reduced solid are removed and then the reduced solid is subjected to an activation treatment using a complex of a dialkyl ether as described hereinafter and titanium tetrachloride or a mixture of such dialkyl ether and titanium tetrachloride. Even in the combination of the prior art method, that is, for removing aluminum compounds with a heating and activating treatment, the catalyst component obtained is not substantially improved, while according to the present invention, a great advantage is obtained by the use of a small amount of a complex consisting of said dialkyl ether and titanium tetrachloride or a mixture of said dialkyl ether and titanium tetrachloride.

It is another feature of the present invention that the method of removing aluminum compounds contained in the reduced solid is not limited to treatment with a specific complexing agent, but that any of several methods can effectively be used. The known method has hitherto succeeded in obtained a relatively large improvement by the combination of the method of removing aluminum compounds by treating with a complexing agent followed by an activation treatment with titanium tetrachloride, but, on the other hand, has the disadvantage that a large improvement cannot be obtained when another complexing agent than diisoamyl ether is used. In fact, according to our experiments, the improvement is very unsatisfactory even when the reduced solid is treated with, for example, di-n-butyl ether and then activated by titanium tetrachloride only, as shown in the following Comparative Examples.

According to the present invention, on the contrary, the removal of aluminum compounds can be carried out not only by the use of a specific compound such as diisoamyl ether but also by the application of other known techniques, so long as the activation is carried out using a complex or mixture of titanium tetrachloride and as hereinafter described dialkyl ether.

It is very difficult to explain why a complex or mixture of titanium tetrachloride and said dialkyl ether has a particular action in the final processing step of the catalyst component in the present invention, but it is true that there is a difference as to the object of using such a dialkyl ether between the present invention and the above described known method, since the quantity of dialkyl ether used in the former is small while the quantity of diisoamyl ether used in the latter is very large, that is, 0.8 to 1 mol per 1 mol of titanium. This is possibly due to the fact that the said dialkyl ether is used for the particular activation action in the present invention, while diisoamyl ether is used for the purpose of removing aluminum compounds present in a large quantity in the known method.

The catalyst component produced by the process of the invention having the above described features is, excellent in activity and produces polymer having a low particle size distribution as is apparent from Examples, and, furthermore, the process of the invention is economical because diisoamyl ether is not used or used in small quantities.

The reducing reaction of the invention is carried out by contacting titanium tetrachloride with a reducing agent consisting of a monoalkylaluminum dihalide and dialkylaluminum monohalide, for example, ethylaluminum dichloride and diethylaluminum monochloride in an inert diluent. In the present invention, in particular, the reducing agent used for the reduction of titanium tetrachloride is a mixture of diethyl aluminum chloride in a quantity equimolar or more to titanium tetrachloride and ethylaluminum dichloride in a suitable quantity. Where the quantity of diethylaluminum chloride used is less than equimolar to titanium tetrachloride, no favorable results are obtained. On the other hand, the quantity of ethylaluminum dichloride used is preferably within a range of 0.3 to 1.2 mol per 1 mol of titanium tetrachloride. As the inert diluent, $C_4$ to $C_{12}$ aliphatic hydrocarbons substantially free of aromatic hydrocarbons or alicyclic hydrocarbons may be used. The temperature of the reducing reaction is relatively important for the properties of the final product and should be adjusted within a range of −50° to +30° C. The reaction is begun by contacting titanium tetrachloride with the reducing agent while agitating the mixture, resulting in deposition of the reducing solid, insoluble in the inert diluent. Contacting is carried out by adding dropwise either a solution of titanium tetrachloride or a solution of reducing agent to the other. All the solutions are preferably agitated for 1 hour or more, preferably, 3 hours or more and during the same time, the reaction system should be kept at the above-mentioned temperature. After both the solutions are completely mixed, the mixture is kept at the same temperature for at least 30 minutes, preferably 1 hour or more, then gradually heated and kept for 15 minutes or more at a constant temperature between 20° and 120° C., preferably between 60° and 100° C. with continuous agitation. The reduced solid obtained in this way should be thoroughly washed with a fresh solvent.

The aluminum compounds contained in the thus resulting reduced solid can be removed by known techniques, for example, by subjecting the solid to a high vacuum to sublimate the aluminum compounds or by treating the reduced solid with a compound capable of forming a complex compound with the aluminum compounds (i.e. complexing agent) and then extracting with a solvent. As the complexing agent (generally a Lewis base), there are used, for example, ethers, thioethers, thiols, organo phosphorus compounds, organo nitrogen compounds, ketones or esters.

Examples of ether complexing agents are diethyl ether, diisopropyl ether, di-n-butyl ether, diisobutyl ether, diisoamyl ether, di-2-ethylhexyl ether, di-2-ethylheptyl ether, allyl ethyl ether, allyl butyl ether, anisole, phenetole, chloroanisole, bromoanisole and dimethoxybenzene.

Examples of the thioether complexing agents are diethyl thioether, di-n-propyl thioether, dicyclohexyl thioether, diphenyl thioether, ditolyl thioether, ethyl phenyl thioether, propyl phenyl thioether and diallyl thioether.

Examples of the organo phosphorus complexing agents are tri-n-butylphosphine, triphenylphosphine, triethyl phosphite and tributyl phosphite. Examples of the organo nitrogen compounds are diethylamine, triethylamine, n-propylamine, di-n-propylamine, tri-n-propylamine and dimethylaniline.

Ethers, in particular, having 4 to 16 carbon atoms are preferable as complexing agents. The extraction can be carried out by any known method, for example, by stirring the reduced solid with an ether compound in an inert medium and separating into a liquid phase and solid phase. Such a medium may be the same as that used in the reducing reaction. The extraction is ordinarily carried out at a constant temperature between 0° and 80° C., for 5 minutes or more, for example, 30 minutes to 2 hours. The quantity of complexing agent used is ordinarily 0.1 to 2.5 mols, preferably 0.4 to 1.0 mol per 1 mol of titanium atom in the reduced solid.

The solid obtained by the above-described treatment is then subjected to an activation treatment with a complex consisting of a dialkyl ether as hereinafter described and titanium tetrachloride or a mixture of such dialkyl ether and titanium tetrachloride. Preparation of such a complex consisting of the said dialkyl ether and titanium tetrachloride can be carried out by contacting both the compounds in equimolar amounts as it is or in a hydrocarbon solvent at room temperature or with heating. This complex is a crystal, complex compound of equimolar dialkyl ether and titanium tetrachloride, which can be confirmed by analysis after purification, for example, by recrystallization using a hydrocarbon solvent. In the activation treatment with a complex according to the present invention, the thus prepared complex is used. The treatment of the solid with a mixture of the dialkyl ether and titanium tetrachloride can be carried out by mixing the solid with dialkyl ether and titanium tetrachloride, but it is preferable to mix both previously before use thereof. The quantity of dialkyl ether used in the activation treatment should be 0.1 mol or more per 1 mol of titanium trichloride in the solid whether the complex or mixture is used. If less than this range of ether is used, the resulting catalyst component is unsatisfactory in regard to polymerization activity and stereoregularity of the product polymer. If more ether is used, the particle size distribution of the catalyst component treated is broadened resulting in an increase of the proportion of fine powder in the product, in addition to poor economics of the process, i.e. use of an excess of an expensive reagent. Therefore, in fact, the quantity of dialkyl ether is preferably 0.1 to 2.0 mol per 1 mol of titanium trichloride. On the other hand, the quantity of titanium tetrachloride is so adjusted that the concentration thereof may be 1% by volume or more, preferably, 5% by volume or more of the whole liquid phase throughout the treatment. This activation treatment is ordinarily carried out using a hydrocarbon solvent such as pentane, hexane, heptane, octane, cyclohexane or cyclopentane in such a manner that the solid concentration in the treating system be 50 to 800 g/l, preferably, 200 to 600 g/l. The temperature of the activation treatment is ordinarily within a range of $-30°$ to 100° C., preferably 40° to 80° C., and the time required for the activation may be 30 minutes but is preferably 1 to 3 hours for best results. Then the thus treated solid should be thoroughly washed with the hydrocarbon solvent used in the above-described treatment.

The dialkyl ether used in the invention has the general formula R—O—R', in which R and R' are the same or different and are each selected from (a) alkyl groups having 1 to 4 carbon atoms, (b) normal alkyl groups of five carbon atoms and (c) alkyl groups having 6 to 20 carbon atoms. Preferably R and R' have three carbon atoms.

Examples of dialkyl ethers having the above general formula are di-n-propyl ether, diisopropyl ether, di-n-butyl ether, diisobutyl ether, isobutyl-n-butyl ether, di-n-amyl ether, di-n-hexyl ether, di-n-heptyl ether, diisoheptyl ether, di-2-ethylhexyl ether, di-n-dodecyl ether, n-butyl-2-ethylhexyl ether, and isobutyl-2-ethylhexyl ether. Mixtures of one or more dialkyl ether can also be used.

The thus obtained catalyst component is used together with a cocatalyst component for the polymerization of α-olefins. As the co-catalyst, organometallic compounds of Group I, II and III elements of the Periodic Table are used. In particular, organic aluminum compounds are preferably used and, above all, triethylaluminum and diethylaluminum chloride are most suitable for the polymerization of propylene. Any polymerization methods known in the art can be used. For example, a liquid monomer may be used as the polymerization medium without using a polymerization diluent or a gaseous monomer may be used similarly.

The present invention will be illustrated in detail by the following Examples.

EXAMPLE 1

700 ml of purified heptane and 250 ml of titanium tetrachloride were charged in a 2,000 ml flask equipped with a stirrer and kept at 0° C., in a bath. 315 ml of diethylaluminum chloride (1.1 mol to 1 mol of titanium tetrachloride) and 117 ml of ethylaluminum dichloride (0.5 mol to 1 mol of titanium tetrachloride) were dissolved in 400 ml of heptane and added dropwise from a dropping funnel. The dropping was continued for a period of about 3 hours and, during the same time, the reaction system was kept at 0° C. After the dropwise addition, the reaction mixture was gradually heated for 1 hour to 65° C., with agitation. The reaction was further continued at the same temperature for another 15 hour. After completion of the reaction, the reaction mixture was allowed to stand to separate the solid formed and the solid was washed with 150 ml of purified heptane three times, followed by drying at 65° C. for 30 minutes under reduced pressure. The thus reduced solid was red violet and, according to X-ray diffraction the peaks of $2\theta = 15.1°$, 33° and 51.3° ($\alpha$-type crystal) were found but the peaks of $2\theta = 16.3°$ and 42.4° ($\beta$-type crystal) were not found or were very small. The particle size distribution of the product was very narrow and there was 1% or less of particles of 5 microns or less. The molar ratio of Al/Ti in the reduced solid was 0.57.

150 g, of the reduced solid was suspended in 1,850 ml of purified heptane, to which 127 ml (equimolar to the titanium in the reduced solid) of di-n-butyl ether (referred hereinafter to as "NBE") was dropwise added for 10 minutes with agitation at room temperature, and the mixture was reacted at 35° C. for 1 hour. After the reaction, the reduced solid was washed three times with 500 ml of purified heptane to remove aluminum compounds contained therein, followed by drying at 65° C. for 30 minutes under reduced pressure.

30 g of the solid, from which the aluminum compounds were substantially removed by the above-described treatment, were resuspended in 53 ml of purified heptane, to which 47.6 ml of a heptane solution of an equimolar complex of di-n-amyl ether (referred hereinafter to as "NAE") and titanium tetrachloride, adjusted previously to a concentration of 2 mols/l, was added, and the mixture was reacted at 65° C. for 2 hours. The molar ratio of NAE to titanium trichloride was 0.6 and the proportion of titanium tetrachloride to the whole liquid phase was 10% by volume. After the reaction, the solid was washed three times with 100 ml of purified heptane, followed by drying at 65° C. for 30 minutes under reduced pressure.

The catalyst solid obtained in this way also had a narrow particle size distribution and there was only 2% of fine powder of 5 microns or less. The molar ratio of Al/Ti in the solid was 0.016.

100 mg of the catalyst solid was charged in an autoclave of 1,000 ml, to which 180 mg of diethylaluminum chloride as co-catalyst, 600 ml (Standard State) of hydrogen as a molecular weight regulator and 800 ml of liquid propylene were added. The polymerization was carried out at a temperature of 68° C. for 30 minutes and the unreacted propylene was removed by flashing, thus obtaining 185 g of polypropylene powder. Thus the polymer yield per 1 g of the catalyst solid (catalyst efficiency, referred hereinafter to as "E") was 1850. This polymer had a melt flow rate of 5.0 (Melt Flow Rate — ASTM D 1238 — referred to as "MFR") and a heptane insoluble content of 97% (referred hereinafter to as "HI"), which was measured by extracting with heptane for 5 hours by means of a Soxhlet extractor.

The results are shown in Table I.

COMPARATIVE EXAMPLE 1

The procedure of Example 1 was repeated except that the activation treatment with the complex consisting of titanium tetrachloride and NAE was not carried out and the polymerization test was immediately carried out, whereby results as shown in Table I were obtained.

It is apparent from these results that the activation treatment with the complex is essential.

COMPARATIVE EXAMPLE 2

The procedure of Example 1 was repeated except that the activation treatment with the complex consisting of titanium tetrachloride and NAE was not carried out and instead a heating and activating treatment was carried out at 150° C. for 1 hour, thereby obtaining results as shown in Table I.

It is apparent from these results that a marked improvement cannot be expected by an activation treatment by heating even after removing aluminum compounds.

COMPARATIVE EXAMPLE 3

The procedure of Example 1 was repeated except that, in place of the activation treatment with the complex consisting of titanium tetrachloride and NAE, an activation treatment with titanium tetrachloride having the same concentration was carried out, thereby obtaining results as shown in Table I.

It is apparent from these results that a marked improvement cannot be expected by activating with titanium tetrachloride alone even after aluminum compounds are removed and it is thus essential to add NAE at the time of treatment with titanium tetrachloride.

COMPARATIVE EXAMPLE 4

The procedure of Comparative Example 3 was repeated except that the treatment with NBE was not carried out and instead a treatment with NAE (equimolar to the titanium trichloride) was carried out, thereby obtaining results as shown in Table I. Not only activity but also particle character was inferior to that obtained by means of this invention. It is apparent from these results that a marked improvement is obtained only when NAE is added at the time of treatment with titanium tetrachloride.

COMPARATIVE EXAMPLE 5

Using titanium trichloride of Grade AA manufactured by Toyo Stauffer Co., a polymerization test as in Example 1 was carried out, obtaining results as shown in Table I.

TABLE I

|  | Ex. 1 | Comparative Example 1 | 2 | 3 | 4 | 5 |
|---|---|---|---|---|---|---|
| NAE/TiCl$_3$ (Molar Ratio) | 0.6 | — | — | — | — | |
| Quantity of TiCl$_4$ in whole Liquid Phase | 10 | — | — | 10 | 10 | AA Grade |
| Al/Ti (Molar Ratio) | 0.016 | 0.08 | 0.09 | 0.015 | 0.020 | 0.335 |
| Quantity of Particles of 5μ or less in Catalyst Solid (%) | 2 | 2 | 2 | 2 | 16 | 12 |
| E | 1,850 | 660 | 370 | 990 | 490 | 410 |
| HI | 97 | 57 | 91 | 95 | 94 | 92 |

TABLE I-continued

|     | Ex. 1 | Comparative Example 1 | 2 | 3 | 4 | 5 |
|-----|-------|----|----|----|----|----|
| MFR | 5.0 | 10 | 6.0 | 5.2 | 6.3 | 4.9 |

EXAMPLES 2 TO 4

The procedure of Example 1 was repeated except the quantity of the equimolar complex of NAE and titanium tetrachloride was varied, obtaining results as shown in Table II.

EXAMPLE 5

The procedure of Example 1 was repeated except that, in place of the complex consisting of titanium tetrachloride and NAE, titanium tetrachloride and NAE were separately added to the processed solid to activate it, obtaining results as shown in Table II.

TABLE II

|  | Example 2 | 3 | 4 | 5 |
|--|---|---|---|---|
| NAE/TiCl$_3$ (Molar Ratio) | 0.1 | 0.3 | 24 | 0.6 |
| Quantity of TiCl$_4$ in whole Liquid Phase (vol. %) | 1.5 | 5 | 40 | 10 |
| Al/Ti (Molar Ratio) | 0.018 | 0.025 | 0.010 | 0.014 |
| Quantity of Particles of 5μ or less in Catalyst Solid (%) | 1 | 1 | 6 | 3 |
| E | 1,290 | 1,480 | 1,900 | 1,800 |
| HI | 89 | 95 | 97 | 96 |
| MFR | 3.8 | 3.9 | 6.2 | 3.9 |

EXAMPLES 6 TO 13

The procedure of Example 1 was repeated except that mixtures of NAE and titanium tetrachloride in various proportion, previously prepared, were used in place of the complex consisting of titanium tetrachloride and NAE, thereby obtaining results as shown in Table III.

TABLE III

|  | Example 6 | 7 | 8 | 9 | 10 | 11 | 12 | 13 |
|--|---|---|---|---|---|---|---|---|
| NAE/TiCl$_3$ (Molar Ratio) | 0.1 | 0.3 | 1.0 | 0.6 | 0.1 | 0.3 | 0.6 | 1.0 |
| Quantity of TiCl$_4$ in Whole Liquid Phase (% by volume) | 10 | 10 | 10 | 25 | 40 | 40 | 40 | 40 |
| Al/Ti (Molar Ratio) | 0.019 | 0.018 | 0.020 | 0.011 | 0.014 | 0.017 | 0.021 | 0.010 |
| Quantity of Particles of 5μ or less size in Catalyst Solid (%) | 1 | 2 | 3 | 2 | 2 | 2 | 3 | 7 |
| E | 1,710 | 2,050 | 1,780 | 2,180 | 1,750 | 2,030 | 2,200 | 1,900 |
| HI | 97 | 97 | 97 | 98 | 98 | 98 | 98 | 96 |
| MFR | 3.9 | 5.0 | 5.8 | 4.2 | 3.6 | 7.1 | 4.3 | 6.0 |

EXAMPLES 14 TO 22

The procedure of Example 1 was repeated except that, in place of NAE, di-n-heptyl ether (referred hereinafter to as "NHE") was used with titanium tetrachloride, thereby obtaining results as shown in Table IV. It is apparent from these results that NHE is effective in the same manner as NAE.

COMPARATIVE EXAMPLE 6

The procedure of Comparative Example 4 was repeated except that in place of NAE, NHE was used, thereby obtaining results as shown in Table IV. The procedure is inferior to this invention not only in respect to activity but also in respect to particle character, it is apparent that a marked improvement is shown only when NHE is added at the time of treatment with titanium tetrachloride.

TABLE IV

|  | Example 14 | 15 | 16 | 17 | 18 | 19 | 20 | 21 | 22 | Comparative Example 6 |
|--|---|---|---|---|---|---|---|---|---|---|
| NHE/TiCl$_3$ (Molar Ratio) | 0.6 | 0.1 | 0.3 | 1.0 | 0.6 | 0.1 | 0.3 | 0.6 | 1.0 | — |
| Quantity of TiCl$_4$ in whole Liquid Phase (% by volume) | 10 | 10 | 10 | 10 | 25 | 40 | 40 | 40 | 40 | 10 |
| Al/Ti (Molar Ratio) | 0.017 | 0.021 | 0.013 | 0.010 | 0.021 | 0.018 | 0.018 | 0.010 | 0.021 | 0.017 |
| Quantity of Particles of 5μ or less size in Catalyst Solid (%) | 2 | 1 | 1 | 3 | 2 | 2 | 2 | 3 | 6 | 15 |
| E | 1,800 | 1,730 | 1,850 | 1,820 | 1,980 | 1,760 | 2,050 | 1,990 | 2,000 | 260 |
| HI | 97 | 97 | 97 | 97 | 98 | 98 | 98 | 98 | 97 | 90 |
| MFR | 4.9 | 7.1 | 4.2 | 6.5 | 7.3 | 2.9 | 5.0 | 5.2 | 5.6 | 3.6 |

EXAMPLES 23 TO 28

The procedure of Example 1 or Example 14 was repeated except varying the quantity of NBE used, thus obtaining results shown in Table V. It is evident from these results that the effect of the quantity of NBE necessary for removing aluminum compounds is not large within the examined range.

TABLE V

|  | Example 23 | 24 | 25 | 26 | 27 | 28 |
|--|---|---|---|---|---|---|
| NBE/TiCl$_3$ (Molar Ratio) | 0.5 | 0.8 | 1.5 | 0.5 | 0.8 | 1.5 |
| NAE/TiCl$_3$ (Molar Ratio) | 0.6 | 0.6 | 0.6 | — | — | — |
| NHE/TiCl$_3$ (Molar Ratio) | — | — | — | 0.6 | 0.6 | 0.6 |
| Quantity of TiCl$_4$ in Whole Liquid Phase (% by volume) | 10 | 10 | 10 | 10 | 10 | 10 |
| Al/Ti (Molar Ratio) | 0.017 | 0.017 | 0.020 | 0.016 | 0.013 | 0.015 |
| Quantity of Particles of 5μ or less size in Catalyst Solid (%) | 1 | 2 | 2 | 1 | 2 | 2 |
| E | 1,810 | 1,880 | 1,900 | 1,790 | 1,830 | 1,820 |
| HI | 97 | 97 | 97 | 97 | 97 | 97 |
| MFR | 5.9 | 6.1 | 3.4 | 6.5 | 5.3 | 5.0 |

EXAMPLE 29 AND 30

The procedure of Example 14 was repeated except that in place of NBE which was used for removing aluminum compound in the reduced solid, diisobutyl ether (IBE) and diisoamyl ether (IAE) was used, thus obtaining results as shown in Table VI.

Table VI

|  | Example 29 | Example 30 |
|---|---|---|
| Complexing Agent | IBE | IAE |
| NHE/TiCl₃ (Molar Ratio) | 0.6 | 0.6 |
| Quantity of TiCl₄ in Whole Liquid Phase (% by volume) | 10 | 10 |
| Al/Ti (Molar Ratio) | 0.020 | 0.018 |
| Quantity of Particles of 5μ or less size in Catalyst Solid (%) | 2 | 2 |
| E | 1,790 | 1,800 |
| HI | 97 | 97 |
| MFR | 3.9 | 5.0 |

COMPARATIVE EXAMPLES 7 AND 8

These experiments involved preparation of a catalyst by known techniues. In Comparative Example 7, titanium tetrachloride was reduced with diethylaluminum chloride alone as a reducing agent in place of the reducing agent consisting of diethylaluminum chloride and ethylaluminum dichloride in Example 1, and the aluminum compound formed was removed by IAE in amount equimolar to titanium in place of NBE and then an activation treatment was carried out with 40% by volume of titanium tetrachloride. In Comparative Example 8, the procedure of Comparative Example 7 was repeated except the quantity of IAE used was decreased to 0.5 molar to 1 mol of titanium. The results are shown in Table VII.

Table VII

|  | Comparative Example 7 | Comparative Example 8 |
|---|---|---|
| Al/Ti (Molar Ratio) | 0.018 | 0.020 |
| Quantity of Particles of 5μ or less size in Catalyst Solid | 6 | 4 |
| E | 1,590 | 690 |
| HI | 97 | 95 |
| MFR | 4.9 | 3.9 |

What is claimed is:

1. A process for the production of a catalyst component for use in the polymerization of α-olefins which comprises reducing titanium tetrachloride at a temperature of from −50° to +30° C. with a dialkylaluminum monohalide and monoalkylaluminum dihalide, said dialkylaluminum monohalide being employed in an amount at least equimolar to said titanium tetrachloride and said monoalkylaluminum dihalide is employed in an amount of 0.3 to 1.2 mols per mole of titanium tetrachloride, to obtain a violet titanium trichloride reduced solid containing aluminum compounds, removing aluminum compounds contained in said reduced solid, and thereafter contacting said reduced solid in an inert diluent and at a temperature within the range of from −30° to 100° C. for at least 30 minutes with an activator which is a complex or mixture of titanium tetrachloride and a dialkyl ether wherein the mole ratio of dialkyl ether to titanium tetrachloride is at least 0.1 and the concentration of titanium tetrachloride is maintained at at least 1 volume percent of the liquid phase, said dialkyl ether having the formula R'OR", in which R' and R" are the same or different and each are selected from the group consisting of (a) alkyl groups having 1 to 4 carbon atoms, (b) normal alkyl groups having 5 carbon atoms, and (c) alkyl groups having 6–20 carbon atoms.

2. A process according to claim 1, wherein the dialkylaluminum monohalide is diethyl aluminum chloride.

3. A process according to claim 1, wherein the monoalkylaluminum dihalide is ethyl aluminum dichloride.

4. A process according to claim 1, wherein the reduction of titanium tetrachloride is effected at a temperature of −50° to +° C. and thereafter the temperature of the reaction mixture is raised to 20° to 120° C.

5. A process according to claim 1, wherein the aluminum compounds are removed by complexing with an ether and then extracting the ether complex of the aluminum compounds with a solvent.

6. A process according to claim 5, wherein the ether complexing agent is selected from the group consisting of diethyl ether, diisopropyl ether, di-n-butyl ether, di-isobutyl ether, diisoamyl ether, di-2-ethylhexyl ether, di-2-ethylheptyl ether, allyl ethyl ether, allyl butyl ether, anisole, phenetole, chloroanisole, bromoanisole and dimethoxybenzene.

7. A process according to claim 1, wherein the alkyl ether employed in mixture or complexed with titanium tetrachloride is an alkyl ether selected from the group consisting of di-n-propyl ether, diisopropyl ether, di-n-butyl ether, diisobutyl ether, isobutyl-n-butyl ether, di-n-amyl ether, di-n-hexyl ether, di-n-heptyl ether, diisoheptyl ether, di-2-ethylhexyl ether, di-n-dodecyl ether, n-butyl-2-ethylhexyl ether, and isobutyl-2-ethylhexyl ether and mixtures thereof.

8. A process according to claim 7, wherein the alkyl ether is di-n-amyl ether.

9. A process according to claim 2, wherein the mol ratio of the diethyl aluminum chloride to titanium tetrachloride is 1 or more to 1.

10. A process according to claim 3, wherein the mol ratio of ethyl aluminum dichloride to titanium tetrachloride is 0.3 to 1 to 1.2 to 1.

11. The catalyst component produced by the process of claim 1.

12. The catalyst component produced by the process of claim 9.

13. The catalyst component produced by the process of claim 10.

14. The catalyst component produced by the process of claim 4.

15. The catalyst component produced by the process of claim 5.

16. The catalyst component produced by the process of claim 6.

17. The catalyst component produced by the process of claim 7.

18. The catalyst component produced by the process of claim 8.

19. A process according to claim 1, wherein, in said contacting of violet titanium trichloride reduced solid in an inert diluent with said activator, the mole ratio of the dialkyl ether to titanium trichloride is within the range of 0.1 to 2.0, the concentration of titanium tetrachloride in the diluent is at least 5 volume percent and the reduced solid concentration in the diluent is at least 50 grams per liter.

* * * * *